United States Patent [19]
Arkfeld

[11] Patent Number: 5,881,702
[45] Date of Patent: Mar. 16, 1999

[54] IN-LINE CATALYST

[76] Inventor: Douglas Lee Arkfeld, 1749 N. Vulcan Ave. Suite 14, Encinitas, Calif. 92024

[21] Appl. No.: 22,866

[22] Filed: Feb. 12, 1998

[51] Int. Cl.$^6$ .................................................... F03M 33/00
[52] U.S. Cl. ............................................................. 123/538
[58] Field of Search .................................. 123/538, 536, 123/537

[56] References Cited

U.S. PATENT DOCUMENTS

| | | | |
|---|---|---|---|
| 5,069,190 | 12/1991 | Richards | 123/538 |
| 5,092,303 | 3/1992 | Brown | 123/538 |
| 5,154,153 | 10/1992 | MacGregor | 123/538 |
| 5,524,594 | 6/1996 | D'Alessandro | 123/538 |

*Primary Examiner*—Marguerite McMahon
*Attorney, Agent, or Firm*—Robert J. Van Der Wall

[57] ABSTRACT

An apparatus for treating fuel for increasing fuel combustion efficiency in an internal combustion engine including a fuel source and a fuel line includes a fuel line supply segment carrying liquid fuel; a fuel line receiving segment in fluid communication with the internal combustion engine; a fuel containment housing having an inlet port and an outlet port; structure for sealingly connecting the housing inlet port to the fuel line supply segment; structure for sealingly connecting the housing outlet port to the fuel line receiving segment; several metal wire strands contained within the housing; and structure for retaining the wire strands within the housing. A method for treating fuel for increasing fuel combustion efficiency in an internal combustion engine including a fuel supply system includes the step of passing the fuel over treating elements within the fuel supply system made up of several different metals.

15 Claims, 3 Drawing Sheets

5,881,702

IN-LINE CATALYST

BACKGROUND OF THE INVENTION

1. Field of the Invention

The present invention relates generally to an improved device, composition of materials and method for charging and polarizing by ionization and heating fluid hydrocarbon fuels prior to combustion, which results in reduced exhaust emissions, improved fuel combustion efficiency and engine performance, and reduced oil contamination in engine crankcases.

More specifically the present invention relates to a device, method and composition of materials for rearranging and charging long and short chain hydrocarbon molecules in liquid fuels, creating electrostatic and thermal molecular disassociation by friction and ambient engine heat and returning fuel from the fuel system. The fuel runs through the engine and returns to the fuel tank and then runs back through fuel delivery system, of which the present invention is part. This return function adds to the ability of the device to cause maximized fuel reaction with metal alloys, resulting in maximum thermal benefits to the fuel.

The molecular reaction occurs as the fuel flows in direct contact with, collides with, passes over, and oscillates through a combination of precious and nonprecious metals and metal alloy knitting mesh wire spiral coils and screens. The screens are made of aluminum only, and are placed in the inlet and outlet passageways of the cylindrical copper and nickel housing device, The copper and nickel housing is so described because its principal alloy components are those metals, but the actual metallurgical constituency is specifically set forth hereinafter. The knitted mesh spiral coiled wire stands, are compacted and composed of various metals, base metals and metal alloys as more specifically set forth hereinafter.

2. Description of the Prior Art

There have long been devices intended to improve fuel efficiency in internal combustion engines. Some of these devices have been effective, yet greater efficiency is still attainable.

It is thus a principal object of the present invention to provide a device which fits into an existing fuel delivery system of a motor vehicle or to an otherwise utilized internal combustion engine which causes fuel to burn more efficiently.

It is another object of the present invention to provide such a device which is highly compact and easy to install.

It is still another object of the present invention to provide such a device which is safe and replaceable.

It is finally an object of the present invention to provide such a device which is relatively inexpensive to manufacture.

SUMMARY OF THE INVENTION

The present invention accomplishes the above-stated objectives, as well as others, as may be determined by a fair reading and interpretation of the entire specification.

An apparatus is provided for treating fuel for increasing fuel combustion efficiency in an internal combustion engine including a fuel source and a fuel line, including a fuel line supply segment carrying liquid fuel; a fuel line receiving segment in fluid communication with the internal combustion engine; a fuel containment housing having an inlet port and an outlet port; structure for sealingly connecting the housing inlet port to the fuel line supply segment; structure for sealingly connecting the housing outlet port to the fuel line receiving segment; several metal wire strands contained within the housing; and structure for retaining the wire strands within the housing.

The several metal wire strands contained within the housing are formed of several different metals. The several metal wire strands contained within the housing preferably are also formed of several different metal alloys. The metal wire strands preferably are coiled. The fuel containment housing preferably includes a tube having an inlet end and an outlet end. The structure for sealingly connecting the housing inlet port to the fuel line supply segment preferably includes an inlet end cap sealingly secured to the end housing inlet end. The structure for sealingly connecting the housing outlet port to the fuel line receiving segment preferably an outlet end cap sealingly secured to the housing outlet end. The tube preferably is formed of metal. The tube preferably includes copper and nickel. The structure for retaining the metal wire strands within the housing preferably includes screen mesh.

A method is also provided for treating fuel for increasing fuel combustion efficiency in an internal combustion engine including a fuel supply system, including the step of passing the fuel over treating elements within the fuel supply system made up of several different metals.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
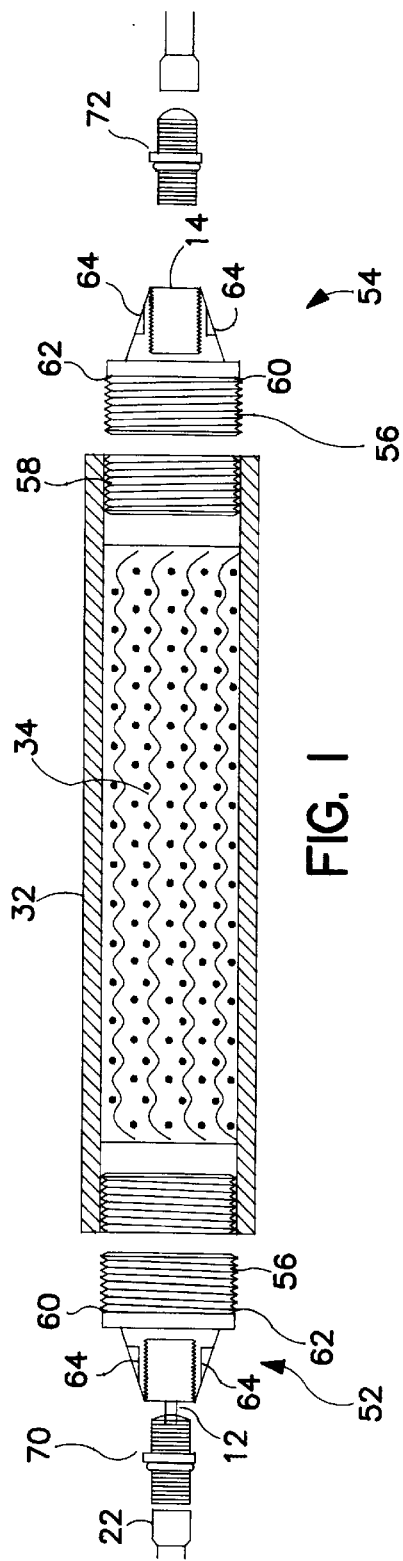
FIG. 1 is an exploded section view of the preferred embodiment of the in-line fuel catalyst.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various Figures are designated by the same reference numerals.

Referring to FIGS. 1–6, an in-line catalyst apparatus 10 is disclosed including an inlet port 12 and an outlet port 14 connected by way of supply and receiving fuel line segments 22 and 24. Inlet port 12 is connected to supply fuel line segment 22 using boss O-ring type male fitting 70 and outlet port 14 is connected to receiving fuel line segment using boss O-ring type male fitting 72. Fuel is pumped from a vehicle fuel tank (not shown) through a fuel filter (not shown) into inlet port 12.

The fuel begins conditioning as it is dispersed throughout apparatus 10 which includes a stainless steel screen mesh 36 encased by a copper and nickel housing 32, which is optionally encased by another metal protective outer housing (not shown). The copper and nickel housing 32 may have the following ranges of metallurgical constituents: C-0.001% to 0.007%, Cu-87.12% to 87.51%, Fe-1.33% to 1.39%, Mn-0.51% to 0.58%, Ni-10.38% to 10.82%, P-0.001%, Pb-0.007%, S-0.010 to 0.011%, and Zn-0.076% to 0.12%. The mechanical properties may be EG/% 31 to 32, GS/MM 0.035 to 0.025, TS/KSI 51.1 TO 51.8, YS/KSI 21.3 TO 22.5.

Stainless steel screen mesh 36 is fitted with a combination of multidirectional metal alloy spiral coiled wire strands 34. Strands 34 are compressed and bunched into a resonant/vibrating electrostatic energy and heat transfer element within stainless steel screen mesh 36. As fuel enters inlet port 12, it immediately comes into contact with screen mesh 36. Apparatus 10 is mounted near the vehicle engine and absorbs engine heat. Almost instantly, the fuel is thermally activated by the heat of housing 32, which simultaneously excites and accelerates the breakup of the fuel hydrocarbon molecules. As the fuel flows past the screen mesh 36, it comes into contact with a variety of metallic alloy strands 34 and against the internal wall surfaces 42 of copper-nickel housing 32.

A catalytic reaction occurs as the fuel collides against and through the spiral shaped metal strands 34 and copper-nickel housing 32. The conditioned fuel is immediately dispersed through outlet port 14 to the inlet of the engine fuel pump. At the ends of housing 32 protrude threaded internal stainless steel or anodized aluminum end caps 52 and 54 and in the manner of a nut, and can be adapted and connected to any existing fuel line. Engine vacuum created by the fuel pump, present in normal engine operations, draws the fuel from the fuel tank through the fuel line through the fuel filter and through inlet port 12, into and between the catalyzing strands 34, out of outlet port 14, and into the engine intake manifold.

Figure 2:
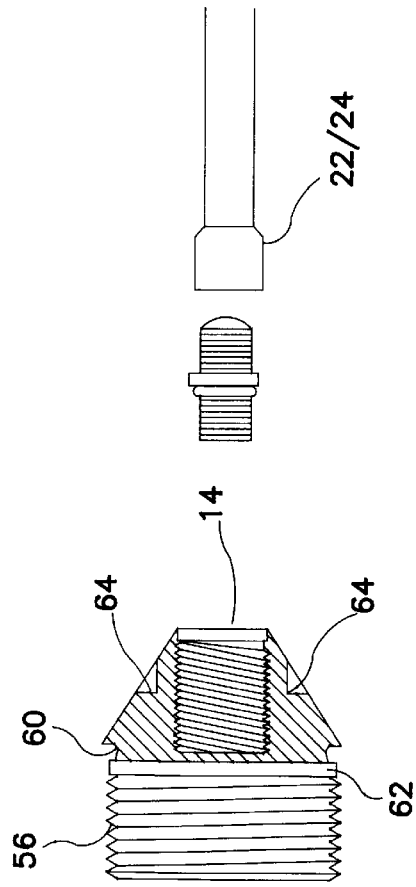
FIG. 2 is an enlarged exploded view of the end cap and fuel line connection components, with the end cap shown in cross section.
Figure 3:
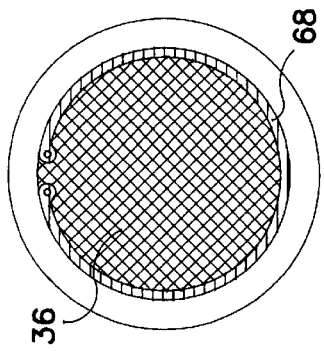
FIG. 3 is an inside end view of the end cap.
Figure 5:
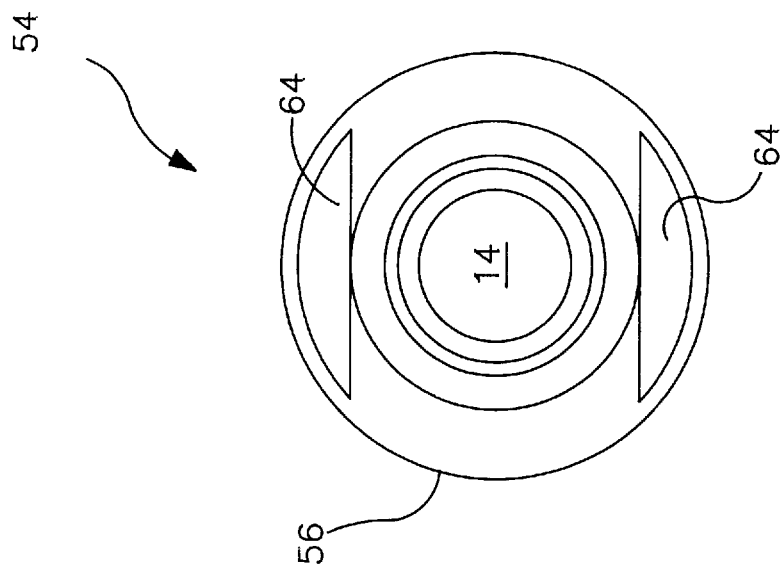
FIGS. 4 and 5 are front and side plan views of an end cap.
Figure 4:
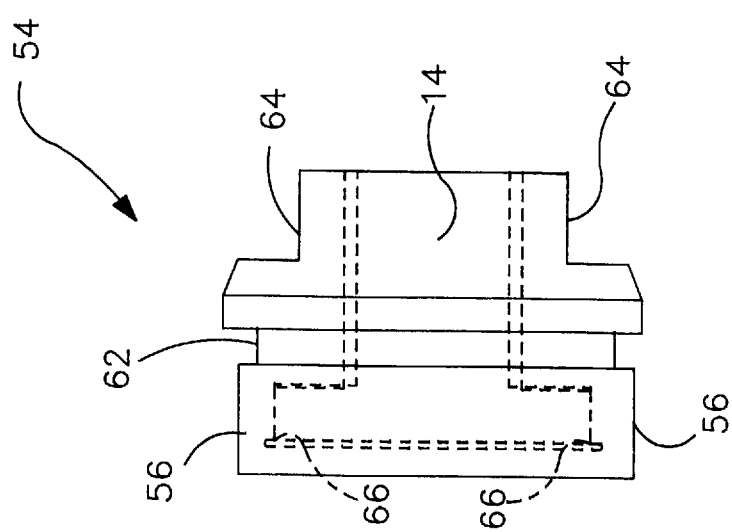
Figure 6:
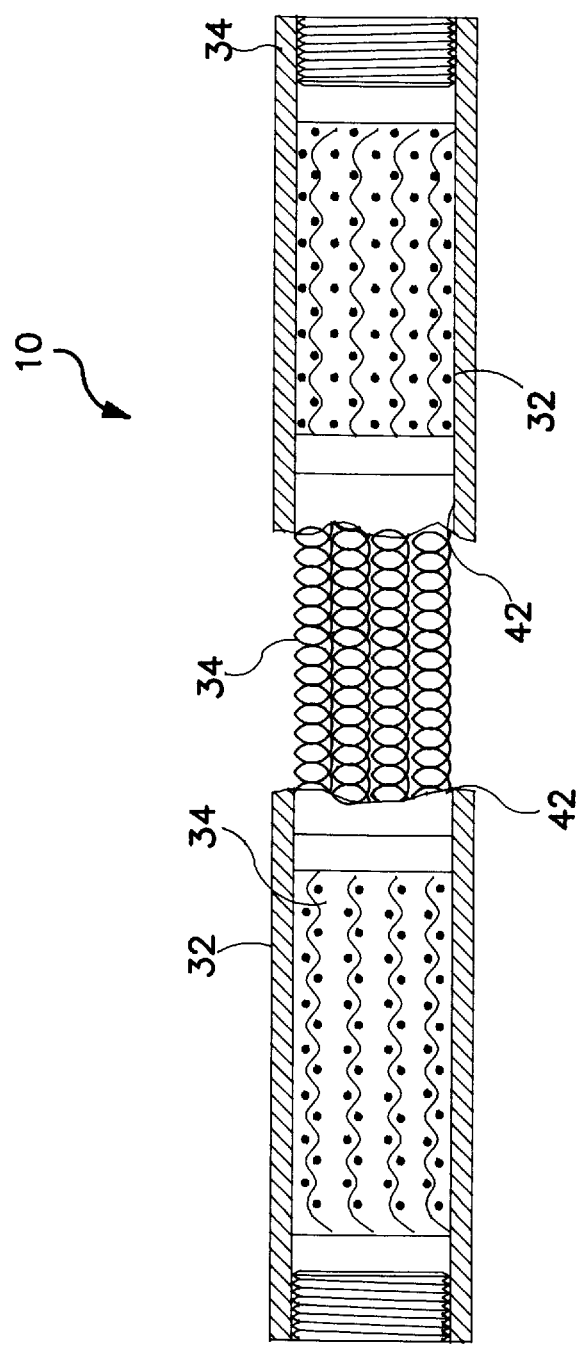
FIG. 6 is a broken cross sectional view of the in-line fuel catalyst tubing with a portion of the tubing removed to show the internal structure.

As shown in FIGS. 1 and 2, apparatus 10 is connected to the fuel line segments 22 and 24 through the use of end caps 52 and 54. Caps 52 and 54 have external threads 56 for securing to internal threads 58 of housing 32. An O-ring 60 rests snugly in an end cap groove 62 to ensure a tight fit between housing 32 and end caps 52 and 54. Boss O-ring male fittings 70 and 72 connect end caps 52 and 54 to the fuel lines 22 and 24. Notches 64 permit creation of a wrench grip on end caps 52 and 54 to ensure a tight fit with housing 32. As seen in FIGS. 3 and 4, screen mesh 36 is held in the inside of end caps 52 and 54 by a snap ring retainer 68 which is disposed in snap ring retainer groove 66.

Apparatus 10 fuel flow is regulated by the internal catalyst and the strands 34 diameter of the inlet and outlet ports 12 and 14, usually ½ to 1 inch producing a flow rate from 0 to 500 gallons per hour. When no engine vacuum is present, such as when the engine is off, the fuel flow from the fuel tank into the intake manifold and/or fuel pump is occluded. When the engine is idling, because a low engine vacuum is present, the flow rate of the fuel remains low until such a time as when the engine is loaded (such as when accelerating or climbing a hill) or when the engine is cruising at a high, constant speed. The vacuum force from the intake manifold and fuel pump is at this point drawing the conditioned fuel with a higher flow rate of approximately 50–500 gallons per hour. This mode of operation automatically provides for the proper degree of fuel flow when the engine is under a load and allows for the conditioned fuel to catalytically react within a 0–3 second time frame so as to be combusted more completely.

Unique to the present invention is its ability to thermally activate and to electrostatically charge the fuel without any modifications to the engine and without or other external, electrical heating or charging components and/or elements provided in other fuel catalyst devices. The electrostatic charging of the fuel molecules within apparatus 10 is a result of friction, copper/nickel conducted ambient frequency waves and the contact catalytic reaction between the hydrocarbon molecules and dissimilar metals. In addition, when installed adjacent to the engine, the copper-nickel housing 32 with stainless steel or anodized aluminum end caps 52 and 54, which encloses the screen mesh 36 containing the combined metal catalyst strands 34, conducts and transfers the engine's ambient heat radiation to the fuel, which amplifies and accelerates the hydrocarbon molecular catalytic transformational process created by apparatus 10.

After field testing and experimenting with numerous combinations of materials and configurations, this new method and apparatus 10 for improving hydrocarbon fuel combustion efficiency has been realized. In a preferred embodiment, the present invention is used in fuel delivery systems of internal combustion diesel and gasoline engines, where it achieves optimal benefits. The method and apparatus 10 use two primary components, the first being a hollow, elongated, cylindrical, preferably 90% copper and 10% nickel metal pipe housing 32 with stainless steel or anodized aluminum inlet and outlet metal end caps 52 and 54. The second component, located inside housing 32, is a bundle of stainless steel knitted mesh coiled wire stands 34, which is a combination of multidirectionally spiraled coiled, metal alloy wires. These are semi-loosely compressed and bunched into a resonant vibrating electrostatic energy and heat transfer element, with silver and aluminum wire screen mesh 36 embedded in the inlet and outlet ports 12 and 14 within the stainless steel or anodized aluminum housing end caps 52 and 54. The stainless steel knitted mesh coiled wire stands 34 have an actual metallurgical composition which includes various precious metals base metals and metal alloys including Ni, Cr, Mn, Si, C, P, S, Ag, and Fe.

By installing the present invention in the lines of the fuel delivery system, adjacent to or very near to a hot running engine and between the injector pump and fuel filter, the copper and nickel in housing 32 acts as a combination thermal and electrostatic conductor. There are no moving parts or power consuming special heating components or electrodes attached to apparatus 10. The vibration of the running engine resonates within and through apparatus 10, causing the catalyst metals, electrons and molecules to oscillate as the fuel flows from and through inlet port 12 to outlet port 14 of apparatus 10. The heat conducted from the copper-nickel housing 32, adjacent to the running engine, effectively increases the fuel's temperature as the fuel passes through apparatus 10.

Also, as the engine is running, apparatus 10 attracts waves of energy out of the air, such as an antenna on a radio or as a dipole does, and transfers this wave energy by convection and conductive transfer mediums, causing further activity on a sub-atomic level to react on the molecules of apparatus 10 and the hydrocarbon fluid passing through apparatus 10. This is also believed to cause ionization of the elements of apparatus 10 and due to the fact that the dissimilar metals each have different polarity, this effects the changed state of the fuel, allowing the fuel to combust more completely.

It is further believed that as the engine operates, the fuel, as it begins to flow through inlet port 12 and comes into contact with and passes between a group of strands 34, the long chain hydrocarbon molecules begin to collide with the adjacent metal screen mesh 36. Almost instantly, the fuel is thermally activated by the copper housing 32 heat, which simultaneously excites and accelerates the breakup (known as molecular cracking) of the hydrocarbon molecule. As the fuel continues past the screen meshes 36 it comes into contact with a variety of metallic alloy coil strands 34 and against the internal wall surfaces 42 of copper-nickel housing 32 with stainless steel or anodized aluminum end caps 52 and 54.

There are at least three unique, yet complimentary, reactions happening as the fuel passes through apparatus 10 from the fuel tank to the engine intake port. As the hydrocarbon fuel electrons flow into the device and come into contact with its components, including housing 32 and screen mesh 36 having various metal alloys, these metals in combination act as an antenna or dipole that attracts static electricity from the surrounding atmosphere, thus building up an electrical charge which is conducted throughout the copper-nickel housing 32 and the other metal alloys of apparatus 10.

This electrostatic charge buildup causes all of the fuel molecules to start cracking due to the combined friction, turbulence, fuel heating and electrostatic charging of the fuel. As the molecules start to crack, they split off and become temporarily dissociated as they pass back and forth through the strands 34 and against the copper-nickel housing 32 interior walls 42. By the time the fuel has passed through apparatus 10 and exits through outlet port 14, the fuel is in a temporarily altered, atomized and electrostatically charged state. The newly refined fuel is immediately delivered into the combustion chamber of each engine cylinder, where it is in an improved state which allows for its increased ability to combust more completely, thus reducing emissions and achieving more useful energy output from ignited fuel, resulting in more fuel efficiency and less crankcase oil contamination.

While improved combustion efficiencies are claimed by other devices, an explanation of how and why the improvements are achieved is variegated. There is, at present, no known quantifiable definition agreed to in the scientific community. When fluid hydrocarbon fuels, long chain hydrocarbon molecules, pass through a housing containing various metal alloys in which contact is made, it is believed by applicant that electrons 3333 are transferred and impose a polarization and catalytic reaction on the molecules of the fuel. This effect improves the ability of the fuel to combust more completely.

Other known retrofit modifications to internal combustion engine fuel delivery systems may or may not reduce exhaust emissions. They do not consistently improve engine performance to the extent the present invention does.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An apparatus for treating fuel for increasing fuel combustion efficiency in an internal combustion engine including a fuel source and a fuel line, comprising:

a fuel line supply segment carrying fuel;

a fuel receiving segment in fluid communication with said internal combustion engine;

a fuel containment housing having an inlet port and an outlet port;

means for sealingly connecting said housing inlet port to said fuel line supply segment;

means for sealingly connecting said housing outlet port to said fuel line receiving segment; and a plurality of metal wire strands formed of a plurality of different metals contained within said housing.

2. The apparatus of claim 1, wherein said metal wire strands contained within said housing are formed of a plurality of different metal alloys.

3. The apparatus of claim 1, wherein said metal wire strands are coiled.

4. The apparatus of claim 1, wherein said fuel containment housing comprises a tube having an inlet end and an outlet end.

5. The apparatus of claim 4, wherein said means for sealingly connecting said housing inlet port to said fuel line supply segment comprises an inlet end cap sealingly secured to said end housing inlet end.

6. The apparatus of claim 4, wherein said means for sealingly connecting said housing outlet port to said fuel line receiving segment comprises an outlet end cap sealingly secured to said housing outlet end.

7. The apparatus of claim 4, wherein said tube is formed of metal.

8. The apparatus of claim 4, wherein said tube comprises copper and nickel.

9. The apparatus of claim 1, which further comprises screen mesh for retaining said metal wire strands within said housing.

10. A method for treating fuel for increasing fuel combustion efficiency in an internal combustion engine including a fuel supply system, comprising the step of:

passing said fuel over treating elements within said fuel supply system made up of a plurality of metal wire strands formed of a plurality of different metals.

11. The method of claim 10 which further comprises thermally activating the fuel.

12. The method of claim 11 wherein thermal activation is achieved by disposing at least part of the fuel supply system in close proximity to the internal combustion engine to utilize engine heat.

13. The method of claim 10 which further comprises electrostatically charging the fuel.

14. The method of claim 10 which further comprises using engine vibration to oscillate the fuel within the fuel supply system.

15. The method of claim 10 which further comprises causing the fuel to be catalytically reacted.

\* \* \* \* \*